United States Patent
Duggal et al.

(10) Patent No.: US 12,554,505 B1
(45) Date of Patent: Feb. 17, 2026

(54) EARLY PHYSICAL REGISTER RELEASE

(71) Applicant: Apple Inc., Cupertino, CA (US)

(72) Inventors: Deepankar Duggal, Sunnyvale, CA (US); Haoyan Jia, Clarksville, MD (US)

(73) Assignee: Apple Inc., Cupertino, CA (US)

( * ) Notice: Subject to any disclaimer, the term of this patent is extended or adjusted under 35 U.S.C. 154(b) by 141 days.

(21) Appl. No.: 18/515,235

(22) Filed: Nov. 20, 2023

Related U.S. Application Data

(60) Provisional application No. 63/584,767, filed on Sep. 22, 2023.

(51) Int. Cl.
*G06F 9/38* (2018.01)

(52) U.S. Cl.
CPC .................... *G06F 9/384* (2013.01)

(58) Field of Classification Search
CPC ....................................................... G06F 9/384
USPC ........................................................ 712/214
See application file for complete search history.

(56) References Cited

U.S. PATENT DOCUMENTS

| | | | | |
|---|---|---|---|---|
| 2007/0157008 A1* | 7/2007 | Sodani | ................... | G06F 9/3012 712/239 |
| 2008/0082755 A1* | 4/2008 | Kornegay | ........... | G06F 12/0855 711/141 |
| 2013/0086364 A1 | 4/2013 | Gschwind et al. | | |
| 2015/0019843 A1 | 1/2015 | Krishna et al. | | |
| 2016/0092222 A1* | 3/2016 | Keppel | ................... | G06F 9/384 712/228 |
| 2018/0004524 A1* | 1/2018 | Mekkat | ............... | G06F 9/30123 |
| 2018/0203703 A1 | 7/2018 | Moudgill et al. | | |
| 2021/0157598 A1* | 5/2021 | Marketkar | ............ | G06F 9/3836 |

FOREIGN PATENT DOCUMENTS

| | | |
|---|---|---|
| CN | 101194225 A | 6/2008 |
| CN | 107250978 A | 10/2017 |
| EP | 1095330 B1 | 11/2002 |
| JP | 10040105 A2 | 2/1998 |
| JP | 2017228267 A2 | 12/2017 |

\* cited by examiner

*Primary Examiner* — Chun Kuan Lee
(74) *Attorney, Agent, or Firm* — Kowert, Hood, Munyon, Rankin & Goetzel, P.C.; Dean M. Muyon

(57) ABSTRACT

A processor with early physical register release is disclosed. The processor includes a pipeline and is configured to operate according to an instruction set architecture defining a number of architectural registers. The processor includes a register file having a number of physical registers, and a mapper configured to map physical registers to architectural registers. In response to detecting a first condition in which first and second instructions share the same destination architectural register, with the second instruction also being a consumer of the destination architectural register, the mapper designates a first physical register (mapped as the architectural register for the first instruction) to be available after execution, and at least one clock cycle prior to retirement, of the second instruction.

20 Claims, 9 Drawing Sheets

EARLY PHYSICAL REGISTER RELEASE

PRIORITY CLAIM

The present application claims priority to U.S. Provisional App. No. 63/584,767 entitled "Early Physical Register Release," filed Sep. 22, 2023, the disclosure of which is incorporated by reference herein in its entirety.

BACKGROUND

Technical Field

This disclosure is directed to processors, and more particularly, to the management of physical registers in processors that utilize register renaming.

Description of the Related Art

Register renaming is a technique employed in modern processors to enhance instruction-level parallelism and mitigate data hazards. In traditional processor designs, registers act as temporary storage for operands during computation. However, when multiple instructions require the same register concurrent with one another, conflicts may arise leading to stalls and decreased performance. Register renaming may resolve this issue by assigning each instruction a temporary physical register that is mapped to an architectural register. At any given time, multiple physical registers can be mapped to a given architectural register. This may in turn eliminate stalls that arise due to register conflicts, and thus allow multiple instructions utilizing a common architectural register to be concurrently in flight. The processor's renaming logic keeps track of the mapping between logical registers (visible to the programmer) and physical registers (used internally by the processor), ensuring correct data flow and enabling instructions to execute in parallel without interference. By enabling efficient handling of register dependencies, register renaming may increase the performance and throughput of modern processors.

SUMMARY

A processor with early physical register release is disclosed. In one embodiment, a processor circuit includes a processor pipeline, and is configured to operate according to an instruction set architecture that defines a number of architectural registers. The processor includes a register file having a number of physical registers, and a mapper circuit configured to map physical registers to architectural registers. The mapper circuit is further configured to detect a first condition in which a first instruction being processed by the processor pipeline has a given destination architectural register and wherein a second, subsequent instruction that is a consumer of the given destination architectural register specified in the first instruction overwrites the given destination architectural register. A first physical register is mapped to the given destination architectural register for the first instruction and a second physical register is mapped to the given destination architectural register for the second instruction. In response to the second instruction being executed in an execute stage of the processor pipeline, the mapper designates the first physical register as being available for use at least one clock cycle of the processor prior to retirement of the second instruction.

In one embodiment, the first and second instructions may be consecutive instructions, although the disclosure contemplates instances in which the first and second instructions are not consecutive. The disclosure contemplates instances in which the second instruction is a single consumer of the destination architectural register, although embodiments in which there are multiple consumers are possible and contemplated (with the second instruction being the last consumer). The instructions may be part of a same reorder buffer group, although embodiments are possible and contemplated in which the first and second instructions are in different reorder buffer groups. It is noted that in instances when the second instruction is the last consumer of a number of instructions, it may use a different architectural register as its destination.

BRIEF DESCRIPTION OF THE DRAWINGS

The following detailed description makes reference to the accompanying drawings, which are now briefly described.

DETAILED DESCRIPTION OF EMBODIMENTS

Figure 1:
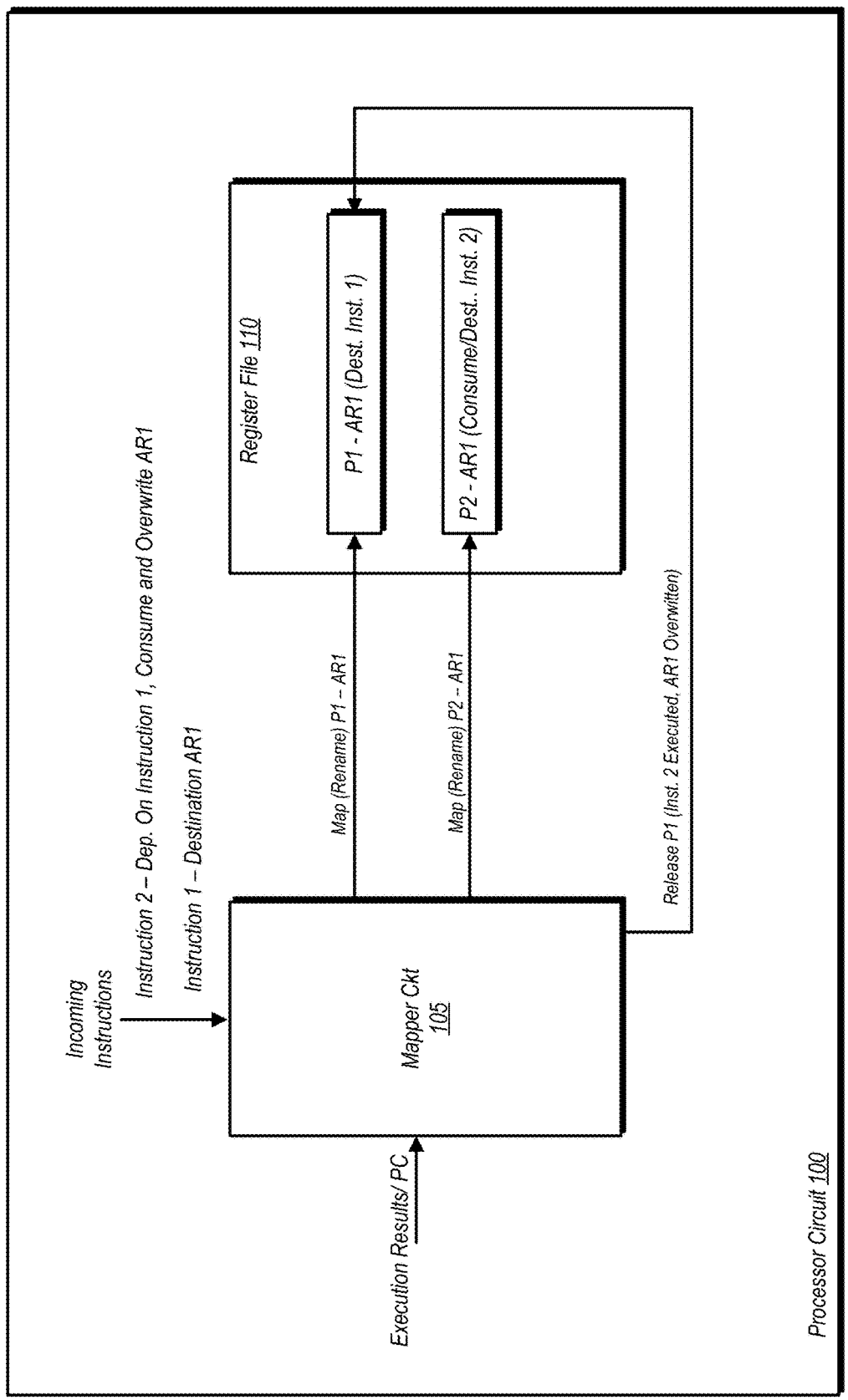
FIG. 1 is a block diagram of one embodiment of a processor having a mapping circuit and a register file.

Register renaming is a technique in which physical registers are mapped to (renamed as) architectural registers, with a mapper maintaining a map indicating which physical registers are mapped to corresponding architectural registers. A free list is used to indicate which physical registers are available for use. This allows for multiple instructions using the same architectural register to be overlapping in execution, or executed concurrently. When an instruction is to commit a value stored in a physical register to an architectural register, the physical register is mapped to the architectural register.

In some code sequences, a first instruction generates a result in a particular architectural register, with the result being consumed by a second instruction that utilizes the same architectural register as a destination, overwriting the first instruction's result. In such code sequences, the physical register used by the first instruction remains in use until the second instruction is retired, even though the results stored therein may no longer be needed. Since there are no other uses for the results store in the physical register associated with the first instruction, it could be released for use as soon as its data is consumed by the second instruction.

The present disclosure provides a mechanism to detect instructions in a code sequence in which a result from a first instruction is consumed by a following, second instruction that has the same destination architectural register as the first instruction. A processor circuit in the present disclosure includes a plurality of physical registers, which may be mapped to architectural registers. A mapper circuit may map a first physical register to the architectural register for the first instruction, while mapping a second physical register to the same architectural register, but for the second instruction. Upon the mapper circuit detecting the condition where the second instruction consumes the results generated by the first instruction, from the same architectural register, and subsequently overwrites the architectural register with the results of executing the second instruction, the mapper circuit may designate the first physical register as being available for early release. A free list is used to track which of the physical registers are available for use. In response to executing the second instruction (thereby consuming and overwriting the results from the first instruction), the physical register associated with the first instruction is released to the free list at least one clock cycle prior to retirement of the second instruction. Once returned to the free list, the first physical register is available for use by another instruction.

It is noted that the use of the terms "map" and "mapping," as carried out by the mapper circuit, are, within this disclosure, interchangeable with the term "renaming" with respect to physical registers. Thus, the act of mapping a particular architectural register to a particular physical register can alternatively be referred to as renaming the particular physical register as the architectural register. Similarly, "mapping a physical register to an architectural register" may be interpreted the same as "renaming the physical register as the architectural register." Furthermore, "assigning" a physical register to an architectural register may be interpreted the same as "mapping" the physical register to the architectural register or "renaming" the physical register as the architectural register. It may further be said that an architectural register may be mapped to a physical register, and that renaming comprises mapping an architectural register to a physical register.

In various embodiments, the instructions may be consecutive, but it is sufficient to ensure that no flush can occur between the first instruction and the second instruction. Accordingly, embodiments are possible and contemplated in which the first and second instructions are not consecutive with respect to one another. Furthermore, while the second instruction may be a sole consumer of the results generated by the first instruction, the present disclosure contemplates that there may be multiple consumers of those results. In such embodiments, the second instruction may be the last, or final consumer of the results generated by the first instruction. The second instruction may also use a different architectural register in embodiments in which it is not the sole consumer of the results generated by the first instruction.

In various embodiments, the first and second instructions may be part of a reorder buffer group. The reorder buffer group may be a group of instructions that includes some that may be executed out of their original program order, although their eventual results are committed to architectural registers in the program order. Irrespective of whether instructions are executed out of order, the grouping into a particular reorder buffer group may ensure that in the event of an exception, the program execution may be rewound to the beginning point of that group. Accordingly, utilizing the early physical register release discussed herein may be carried out without generating problems in which the program cannot be rewound to a particular point. However, the disclosure does contemplate embodiments in which the first and second instructions are in different reorder buffer groups.

Utilizing the early physical register release techniques disclosed herein may allow physical registers to be released earlier than would otherwise be possible by waiting for a consumer instruction to retire. Accordingly, more efficient use of physical registers is possible, while the pressure to increase the number of physical registers in a future implementation of the processor is reduced.

Figure 2:
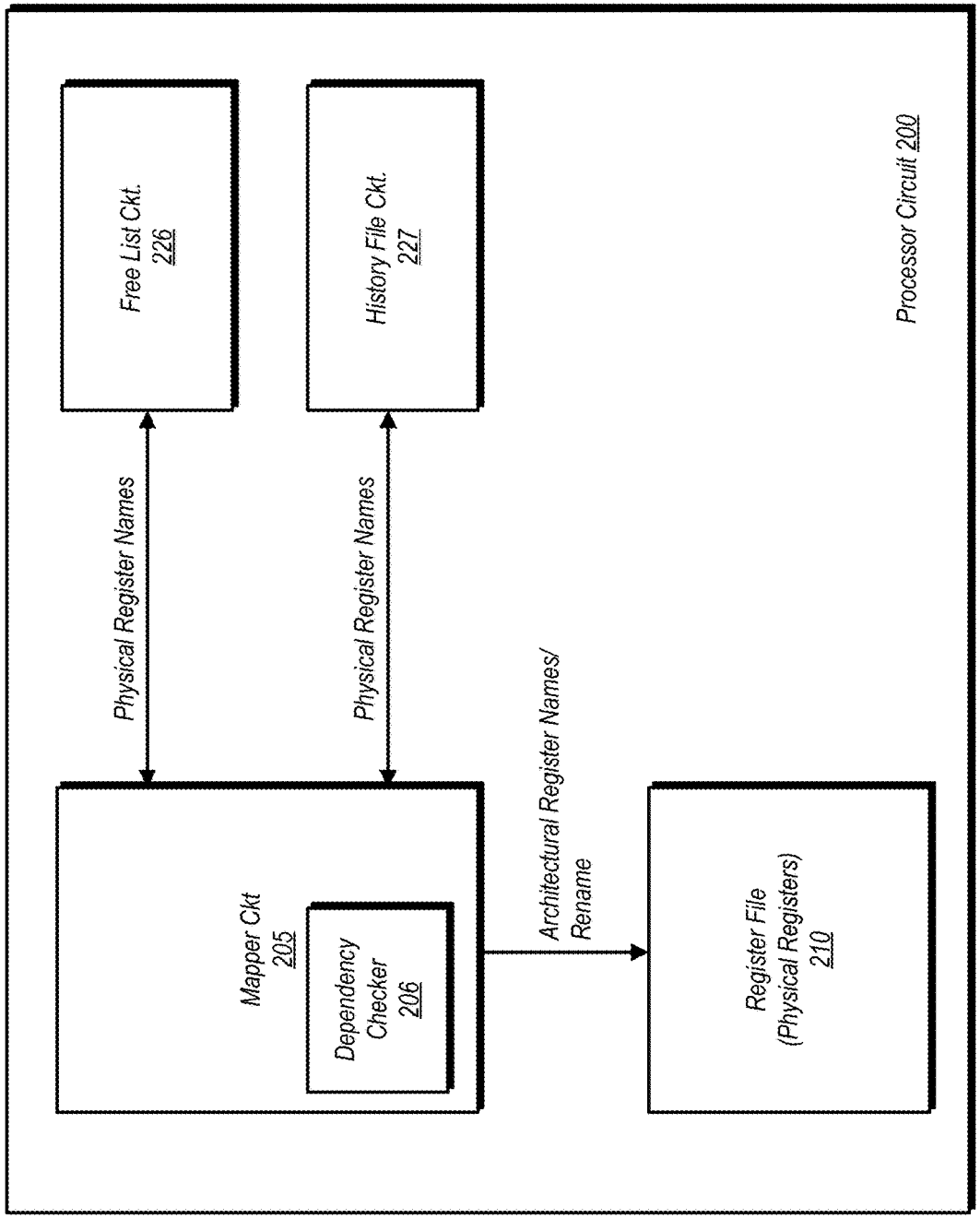
FIG. 2 is a block diagram of an embodiment of a processor having a mapping circuit, register file, history file circuit, and free list circuit.
Figure 5:
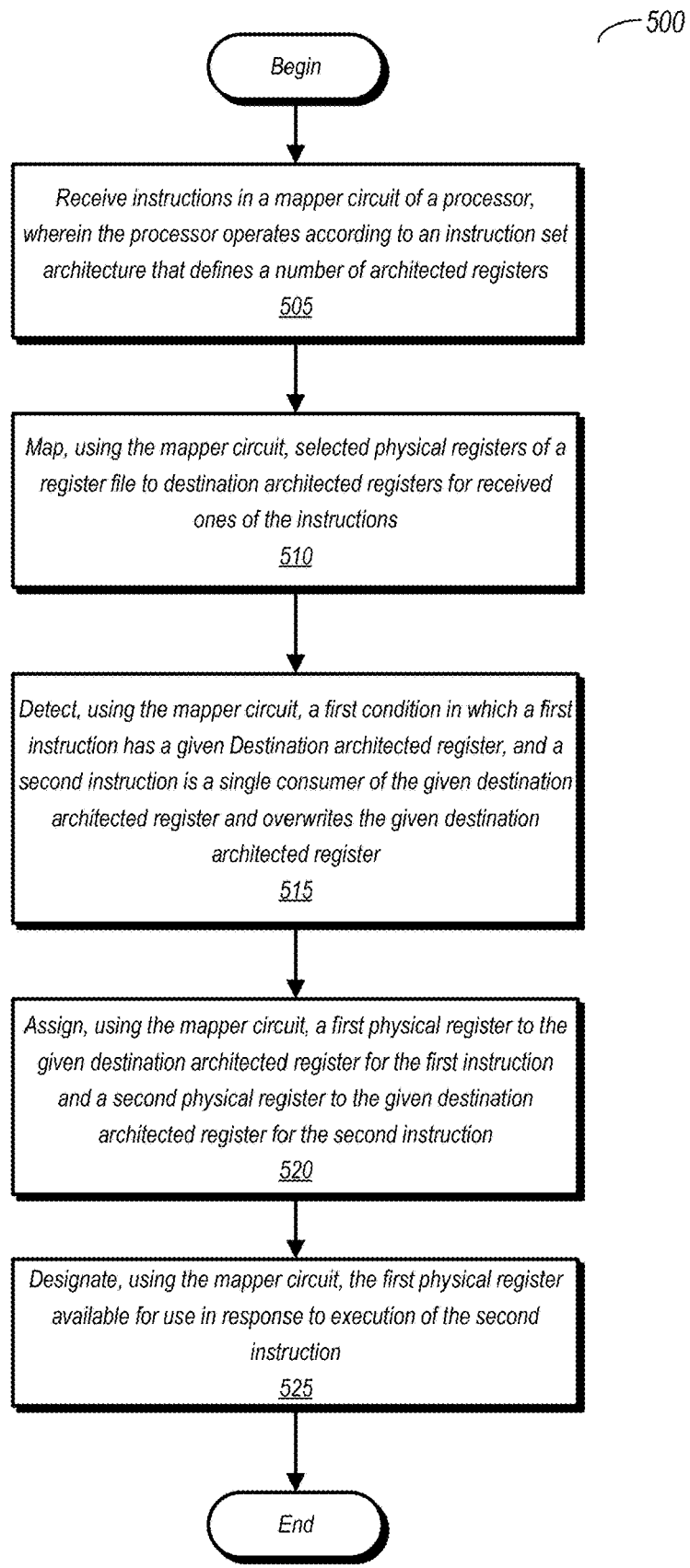
FIG. 5 is a flow diagram of one embodiment of a method for performing register renaming in a processor circuit.
Figure 6:
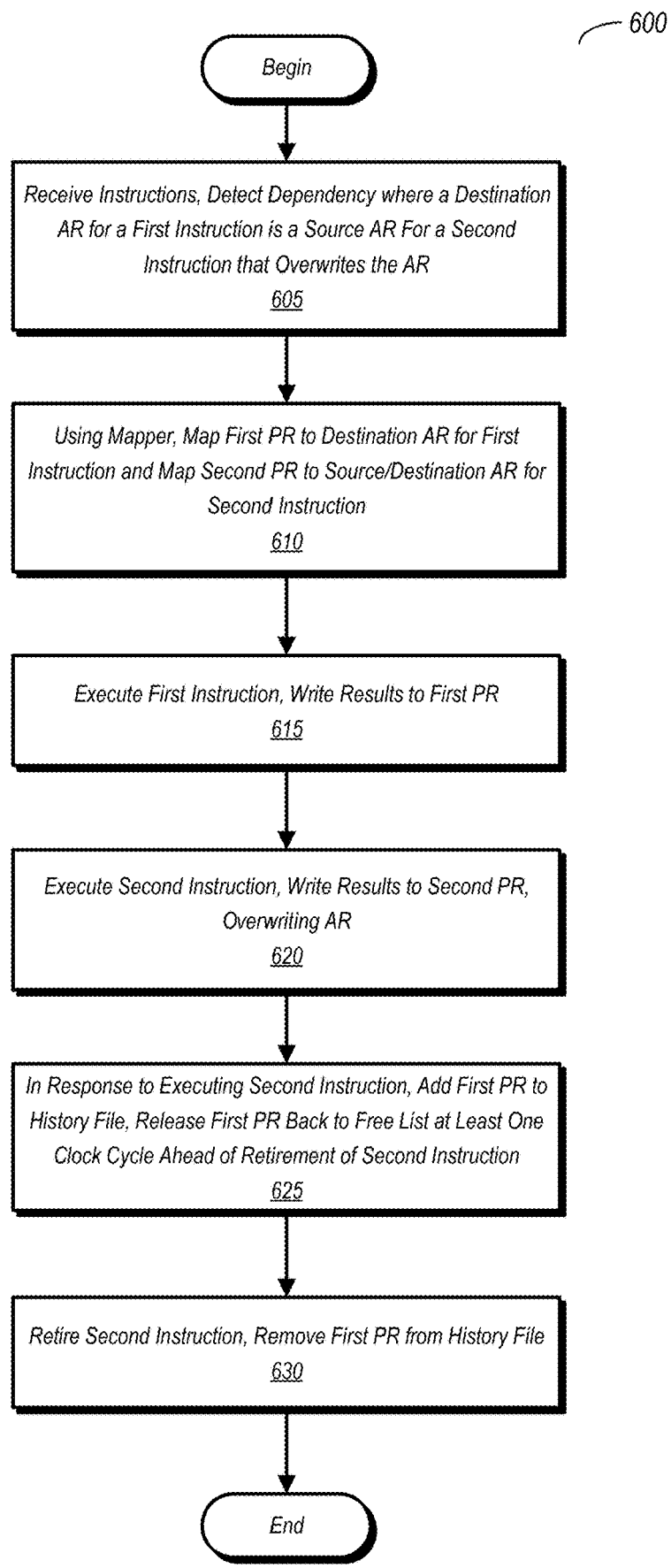
FIG. 6 is a flow diagram of another embodiment of a method for performing register renaming in a processor circuit.
Figure 8:
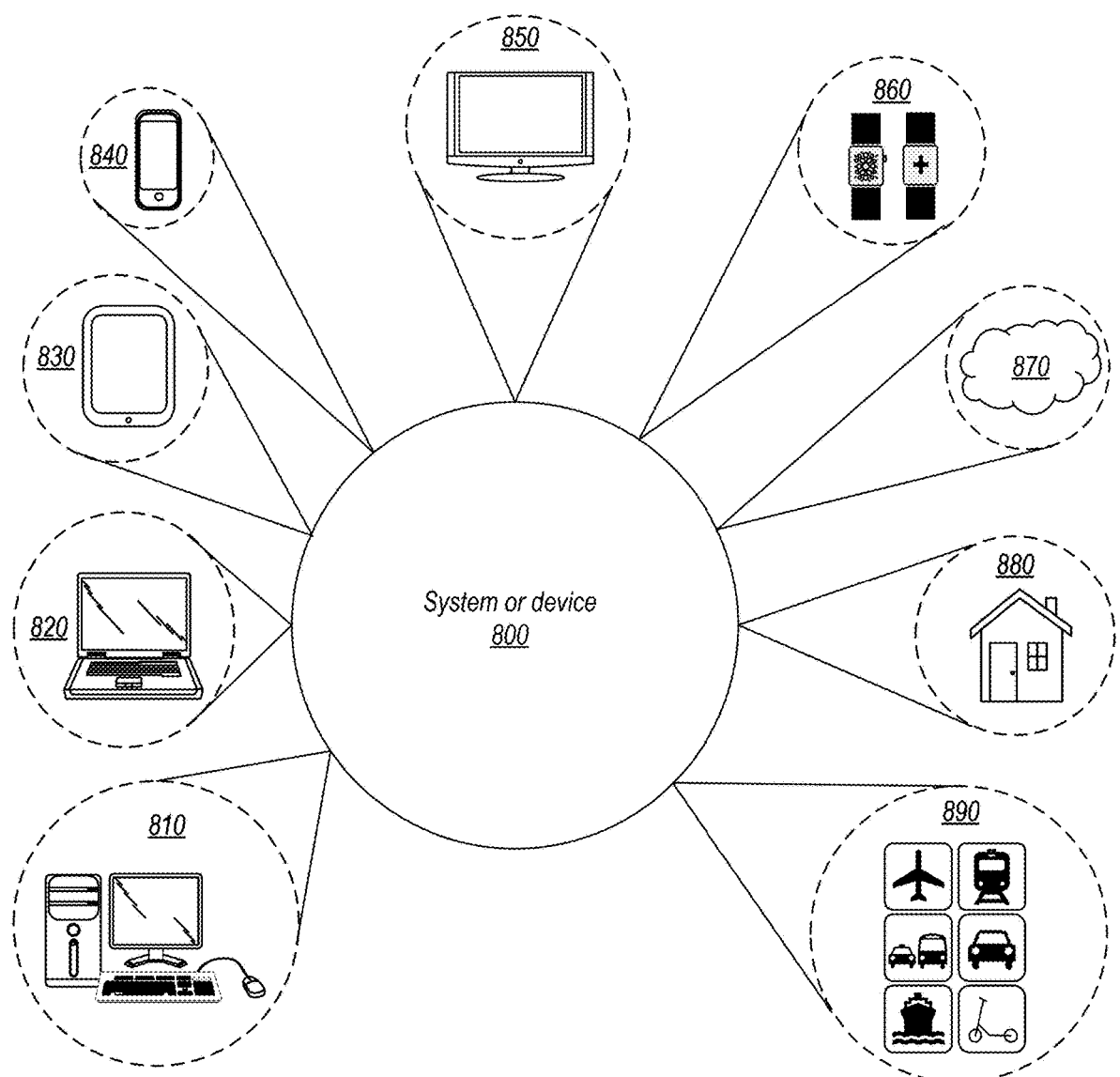
FIG. 8 is a block diagram illustrating various embodiments of a system.
Figure 9:
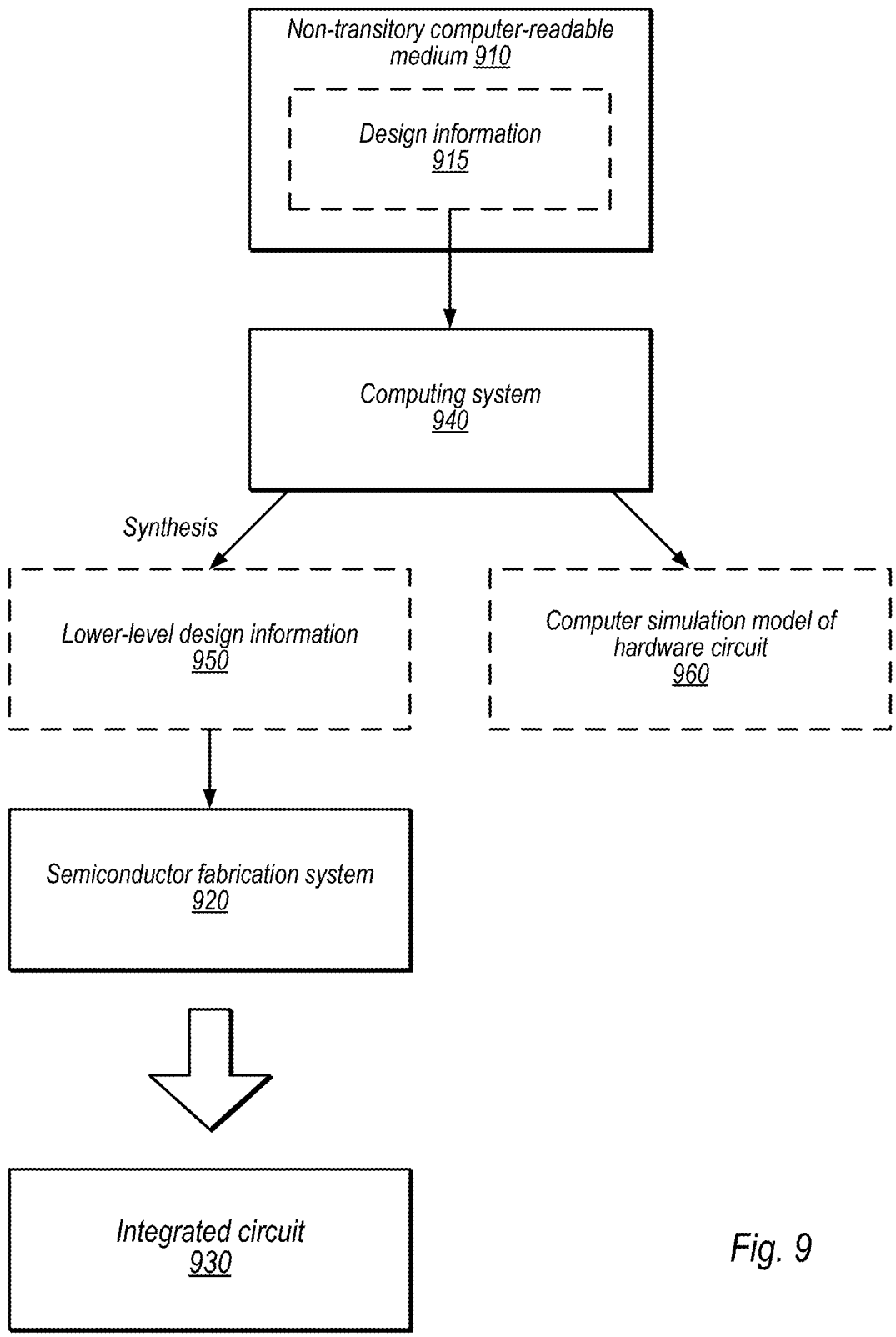
FIG. 9 is a block diagram illustrating an example non-transitory computer-readable storage medium.

Apparatus and method embodiments for carrying out early physical register release are now discussed in further detail. The discussion begins with embodiments of processor hardware, as illustrated in FIGS. 1 and 2, that may be used to carry out early physical register release. Thereafter, a description is provided of the operation of early physical register release as graphically illustrated in FIG. 3. A processor pipeline in which early physical register release may be performed is described with reference to FIG. 4. Method embodiments, as illustrated in FIGS. 5 and 6, are discussed thereafter. A block diagram of a device (FIG. 7) is then discussed, the device being one in which the apparatus and method embodiments of the disclosure may be implemented. This is followed by descriptions of various applications of a system in which such a processor may be used, and the design and manufacture of the same using information on a computer readable medium (FIGS. 8 and 9, respectively).

Apparatus for Performing Early Physical Register Release:

FIG. 1 is a block diagram of one embodiment of a processor having a mapping circuit and a register file. In the embodiment shown, processor circuit 100 includes a mapper circuit 105 and a register file 110. The register file 110 includes a plurality of physical registers, with the plurality including the two physical registers P1 and P2 as shown here. These physical registers may be renamed as architectural registers during the operation of processor circuit 100, thereby enabling more instruction level parallelism by allowing multiple instructions utilizing the same architectural register to be concurrently in flight.

Mapper circuit 105 in the embodiment shown is configured to carry out register renaming in which physical registers are mapped to architectural registers. Incoming (not yet executed) instructions, or information corresponding thereto, may be provided to mapper circuit 105 from other circuits within processor 105 (such as a fetch and decode circuit or a schedule/dispatch circuit). The incoming instruction information may include information about which architectural registers the instructions are to use, as a source and/or a destination, as well as various dependencies of certain instructions on other instructions. A register may be a source register when information stored therein is needed for execution of an instruction (e.g., when it stores an operand for an addition instruction). A register may be a destination (or target) when the results of instruction execution are written to that register (e.g., when the register is to store a sum generated by execution of an addition instruction). The dependencies indicated in the incoming instruction information may, for example, tell mapper circuit 105 when a particular instruction uses, as a source from an architectural register, information generated by a previously executed instruction that used the same architectural register as a destination.

Mapper circuit 105 may receive indications of executed instructions and/or a program counter (PC) from, e.g., execution circuits in the processor. This may provide information to mapper circuit 105 indicating that instructions have written results to certain architectural registers, and, if dependencies are pending, when source data stored therein is available for the execution of subsequent instructions.

Using this information, mapper circuit 105 may carry out the mapping of the various physical registers in register file 100 to architectural registers. Although not shown here (but discussed below in reference to other figures), mapper circuit 105 may access a free list to determine which physical registers are available for mapping. Mapper circuit 105 may also add names of physical registers back to such a free list when those physical registers are no longer in use by a particular instruction or group of instructions.

In the embodiment shown, mapper circuit 105 may use indications of certain types of dependencies to enable the early release of some physical registers. Typically, a physical register is not released back to the free list until a corresponding instruction is retired (the physical register was mapped to an architectural register for the corresponding instruction). One such condition that may be detected by mapper circuit 105 is that in which a first instruction that is being processed within a pipeline of processor circuit 100 has a given destination architectural register, while a second, subsequent instruction is a consumer of the information written to the architectural register by the first instruction. The second instruction may be a sole consumer of that architectural register, although the disclosure contemplates that multiple instructions may consume the same data from that architectural register. Furthermore, the first and second instructions in this scenario may be consecutively executed, although the disclosure contemplates that one or more intervening instructions may be executed between execution of the first and second instructions.

When two instructions utilize the same architectural register as in the scenario of the previous paragraph, mapper circuit 105 in the embodiment shown assigns a first physical register (P1, as shown in the drawing) to be mapped to the architectural register (AR1) for the first instruction, and a second physical register (P2, as shown in the drawing), to be mapped as both a source and destination architectural register (AR1) of the second instruction. After execution, results of the first instruction are written into P1/AR1. Once this dependency is satisfied, the second instruction may execute, thereby consuming the information from P1/AR1 as its source, and writing its results into P2, which is also mapped to AR1. Since, in this scenario, there are no further consumers of the information in P1/AR1, mapper circuit 105 may release P1 back to the free list, thus making it available to be mapped to an architectural register for use with other instructions. This may occur at least one clock cycle prior to the retirement of the second instruction. Accordingly, P1 is released to the free list at least one clock cycle earlier than it otherwise would be released in previous embodiments in which retirement of a consumer instruction was required for release.

The technique described above to enable early release of physical registers may allow a processor to more efficiently exploit instruction level parallelism. Other instructions can be scheduled to utilize the released physical register once it is returned to the free list, and since this occurs early, their scheduling may also be performed early. This in turn may lead to performance increases, and this improved performance may be obtained without increasing the size of the physical register file.

FIG. 2 is a block diagram of an embodiment of a processor having a mapping circuit, register file, history file circuit, and free list circuit. In the embodiment shown, processor circuit 200 includes a mapper circuit 205, a physical register file 210, a free list circuit 226, and a history file circuit 227.

Mapper circuit 205 in the embodiment shown carries out the renaming of registers by mapping physical registers in register file 210 to architectural registers. Mapper circuit 205 may receive information regarding instructions that have been decoded and are ready to be scheduled for execution in an execution unit of processor circuit 210.

Free list circuit 226 in the embodiment shown includes storage for storing a list of the names of physical registers in register file 210 that are currently free for renaming. In determining a physical register that is to be renamed as an architectural register, mapper circuit 205 searches free list 226 to determine which physical registers are available for renaming. Mapper circuit 205 then picks a particular physical register from the available names in free list circuit 206 and maps it to the architectural register. In picking a particular physical register, mapper circuit 205 may cause its name to be either removed from free list circuit 226, or alternatively, an entry corresponding to the physical register may be marked to indicate that it is currently unavailable for renaming.

Mapper circuit 205 in the embodiment shown also includes a dependency checker circuit 206. The dependency checker circuit 206 may determine if dependencies exist between two or more instructions. For example, dependency checker circuit 206 may detect that a particular instruction utilizes results stored into an architectural register as a result of the execution of the prior instruction. In one embodiment, dependency checking may be carried out within a reorder buffer group, which is a particular group of instructions that are entries in a reorder buffer group and may carry a common check point or boundary to allow rewinding of the execution in the event of an exception, such as a branch misprediction. Instructions not dependent on others within the group may be executed out of order, although circuitry in the reorder buffer may ensure that the results of these instructions are committed to architectural registers in the intended program execution order.

History file circuit 227 in the embodiment shown includes circuitry configured to store physical register names (and their associated architectural register renames) corresponding to instructions that have been executed. This information may remain stored in history file circuit 227 at least until the instruction is retired, and may remain until any dependent instructions are also retired. In this manner, should a rewind be required, information regarding the renamed physical registers is available. After an instruction is retired, and any dependent instructions are also retired, information corresponding to the physical registers utilized thereby may be removed from the storage of history file circuit 227. For example, if all instructions in a given reorder buffer group have been retired, information regarding renamed physical registers associated with those instructions may be removed from the storage of history file circuit 227.

Figure 3:
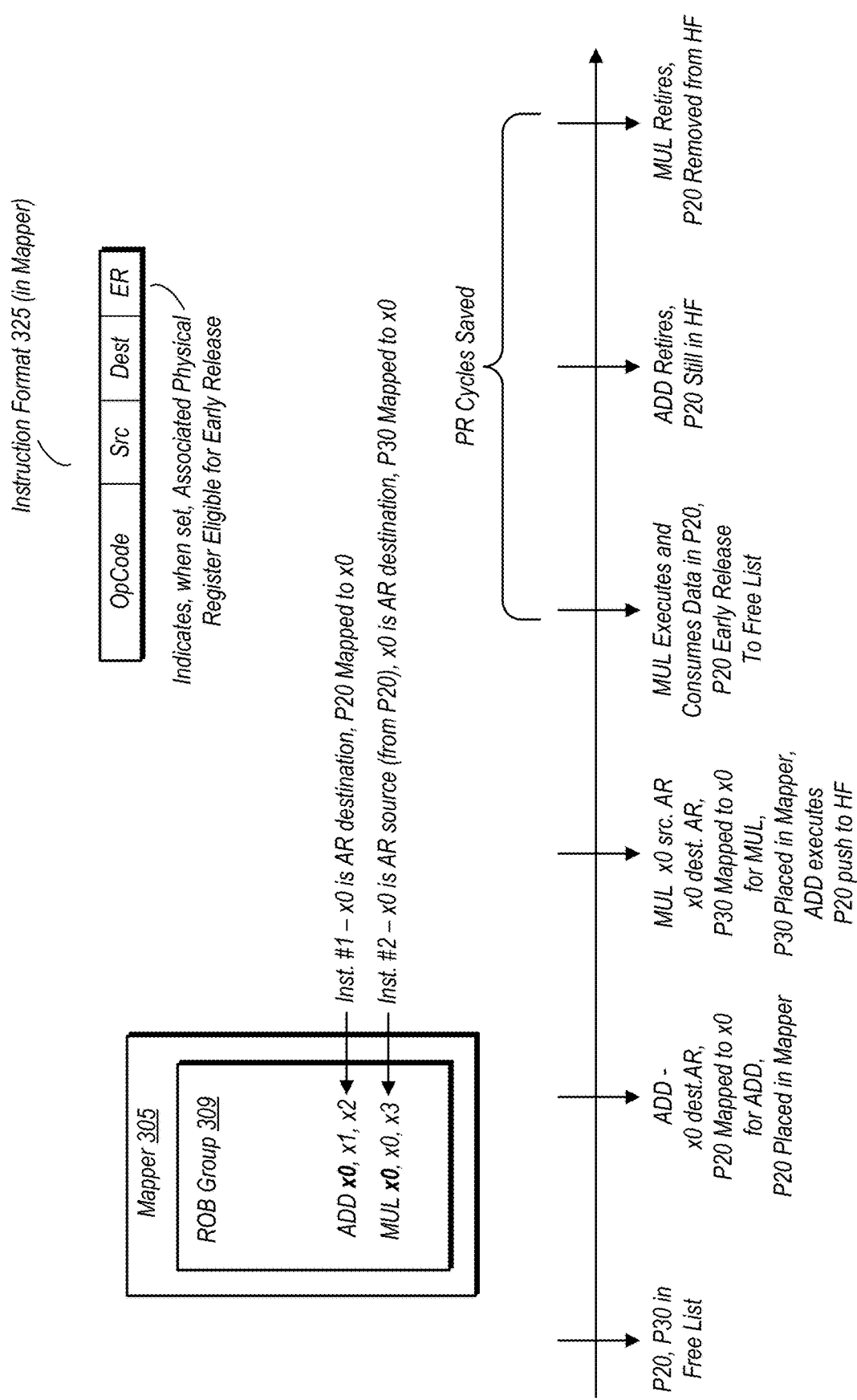
FIG. 3 is a diagram graphically illustrating early physical register release for one embodiment of the disclosure.

Example of Early Physical Register Release:

FIG. 3 is a diagram graphically illustrating early physical register release for one embodiment of the disclosure. In the embodiment shown, mapper circuit 305 is renaming registers corresponding to instructions in a reorder buffer group 309. Within reorder buffer group 309, there are two instructions that both utilize the same architectural register, with one instruction being dependent on the other.

The first instruction, ADD, performs an addition of operands stored in architectural registers x1 and x2, with the resulting sum stored in architectural registers x0. The MUL instruction is dependent on the ADD instruction in this example, as it consumes the results generated by execution of the ADD instruction. The MUL instruction multiplies the value stored in architectural register x0 with the value stored in architectural register x3. Additionally, the product of the multiplication carried out by execution of the MUL instruction is stored in architectural register x0. Thus, the ADD instruction in this case is a producer with respect to architectural register x0. The subsequent MUL instruction, dependent on the ADD instruction, is both a consumer and a producer with respect to architectural register x0. To put another way, x0 is a destination for the ADD instruction, while x0 is both a source and a destination for the MUL instruction.

At the beginning of the sequence depicted here, both physical registers P20 and P30 are indicated as being free by the free list. These registers may thus be chosen by mapper circuit 305 to be mapped to x0 for the ADD and MUL instructions, respectively. Physical register P20 is mapped architectural register x0 to provide a destination for execution of the ADD instruction. With the MUL instruction utilizing architectural register x0 as a destination, physical register P30 is also mapped to architectural register x0. The ADD instruction executes, with the result thereof being written to P20/x0. At this time, the name of P20 is pushed to the history file stored in a history file circuit, such as that discussed above with reference to FIG. 2. Subsequent to execution of the ADD instruction, the MUL instruction executes and consumes the data stored in P20/x0, and writes the corresponding result to P30/x0.

With the execution of MUL and the overwriting of architectural register x0, P20 is no longer needed as a physical register mapped to x0. Accordingly, mapper circuit 305 releases P20 and adds its name to the free list, making this physical register available for use by other instructions. Subsequent to its release, physical register P20 may be mapped by mapper circuit 305 to an architectural register for another instruction that is scheduled to be executed. It is noted here that P20 is released even before the ADD instruction retires, and thus, at least two clock cycles before the MUL instruction retires. In general, the disclosure contemplates early physical register release occurring at least one clock cycle (or processor cycle equivalent) prior to the retirement of the dependent instruction (MUL in this example), although early release by more than one cycle is also contemplated, as in this particular example.

Subsequent to the execution of the MUL instruction, the ADD instruction retires, although the name P20 remains in the history file. Subsequently, the MUL instruction retires, and as a result thereof, the name of P20 is removed from the history file, as the MUL instruction was the last consumer of P20/x0 in this particular example.

Also illustrated in FIG. 3 is an instruction format per the present disclosure. In the embodiment shown, instruction format 325 includes an opcode, which indicates which operations are to be performed. Source (Src) and destination (Dest) registers, if any, are also indicated to allow mapper circuit 305 to know the architectural registers to which physical registers may be mapped to architectural registers to enable execution of the instruction. The instruction format 325 also includes an ER field that may be used to indicate that at least one of the physical registers associated with the instruction is eligible for early release. In one embodiment, this field may be as little as a single bit that, when set, indicates the early release eligibility. However, embodiments that utilize more than a single bit and that may provide additional information associated with the early release eligibility are also possible and contemplated.

Figure 4:
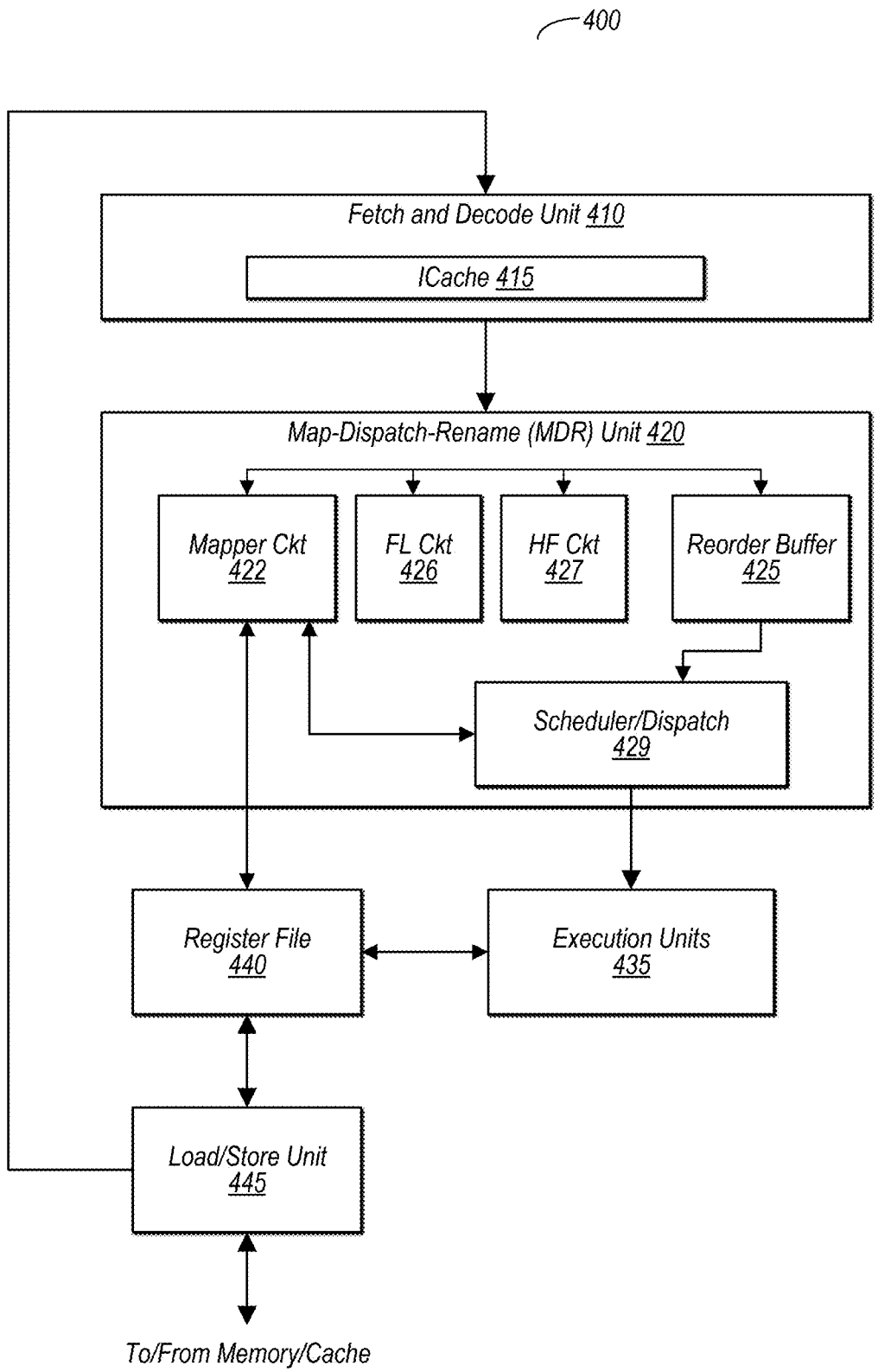
FIG. 4 is a block diagram of one embodiment of a pipeline in a processor circuit.

Processor Pipeline Embodiment:

FIG. 4 is a block diagram of one embodiment of a processor pipeline in which the early physical register release of the present disclosure may be carried out. In the embodiment shown, processor pipeline 400 includes a fetch and decode unit 410 (which includes an instruction cache 415), a map-dispatch-rename (MDR) circuit 420, a register file 440, execution units 435, and a load/store unit 445. MDR circuit 420 in the embodiment shown includes a mapper circuit 422, a free list circuit 426, a history file circuit 427, a reorder buffer circuit 425, and a scheduler/dispatch circuit 429.

Fetch and decode unit 410 in the embodiment shown includes circuitry used to fetch instructions from a memory or a cache for subsequent execution. In various embodiments, fetch and decode unit 410 includes one or more prefetchers configured to speculatively fetch instructions, but may also carry out non-speculative fetches. Some fetched instructions, such as those that are frequently used, may be stored in instruction cache 415 subsequent to being fetched from memory. Fetch and decode unit 415 may also include decode circuitry configured to decode fetched instructions. The decoding of an instruction may include determining the operation(s) to be carried out, source and destination registers to be used in execution of the instruction, and other information, such as indications of a conditional branch.

Mapper circuit 422 of MDR unit 420 may carry out register renaming operations per the disclosure. In particular, mapper circuit 422 may map physical registers in register file 440 to architectural registers that are used as a source or a destination by various instructions to be executed. In determining which physical registers to use, mapper circuit may access a free list stored in free list circuit 426 to determine availability of the various physical registers. Mapper circuit 427 may also place information corresponding to physical registers used in executed instructions into history file 427, where the information may remain until the corresponding instructions and any dependent instructions have been retired.

Reorder buffer circuit 425 may group instructions into reorder buffer groups, and may also perform reordering of instructions to enable out-of-order execution when permitted. For example, an instruction that is a last instruction of a particular reorder buffer group, but has no dependency on any other instruction in the group, may be reordered to execute first. The enabling of out-of-order execution may allow more efficient use of processor pipeline 400 by helping to keep pipeline stages full. Reorder buffer circuit 425 may also ensure that results of instructions of a particular reorder buffer group are committed to architectural registers and those instructions retired in the intended program order.

Scheduler/dispatch circuit 429 may schedule instructions for execution, and may also dispatch instructions to the execution units 435. In scheduling instructions for execution, scheduler/dispatch circuit 429 may receive information, from reorder buffer circuit 425, indicative of the actual order in which instructions are to be executed within a particular reorder buffer group. Furthermore, scheduler/dispatch circuit 429 may also provide information regarding scheduled instructions to mapper circuit 422 in order to enable physical registers of register 440 to be scheduled for mapping to architectural registers associated with the instructions. Mapper circuit 422 may provide information corresponding to mapped physical registers back to scheduler/dispatch circuit 422 in order to enable execution circuits in execution units 435 to find any required source data as well as find destination registers in which to write results.

Execution units 435 may comprise various execution circuits that execute instructions received from scheduler/dispatch circuit 429. The various types of execution circuits may include one or more integer value execution circuits, one or more fixed point execution circuits, and one or more floating point execution circuits. Other types of execution circuits are also possible and contemplated. In executing instructions, the various execution circuits may access register file 440 to obtain any required source data/operands from register file 440, using information regarding renamed registers originally generated by mapper circuit 422. The various execution circuits may also write results of executed instructions to physical registers designated as destination registers per the register renaming carried out by mapper circuit 422.

Load/store unit 445 in the embodiment shown comprises at least one additional execution circuit that is specialized for memory accesses. These operations include carrying out loads, in which instructions and/or data is loaded from another storage in a memory hierarchy that may include multiple levels of cache memory, a main system memory, and bulk storage. Stores carried out by load/store unit 445 may store information back to main system memory, and may also include storing the data to one or more levels of cache memory, as well as to bulk storage.

Method Embodiments:

FIG. 5 is a flow diagram of one embodiment of a method for performing early physical register release. Method 500 may be carried out by and within any of the various hardware embodiments discussed elsewhere herein. Apparatus/hardware embodiments capable of carrying out Method 500, but not explicitly disclosed herein, are also considered to fall within the scope of this disclosure.

Method 500 includes receiving instructions in a mapper circuit of a processor, wherein the processor includes a processor pipeline and operates according to an instruction set architecture that defines a number of architectural registers (block 505), and mapping, using the mapper circuit, destination architectural registers for received ones of the instruction to physical registers of a register file (block 510). The method further includes detecting, using the mapper circuit, a first condition in which a first instruction has a given destination architectural register, and a second instruction is a single consumer of the given destination architectural register and that overwrites the given destination architectural register (block 515). In response to detecting the first condition, the method further includes assigning, using the mapper circuit, a first physical register to the given destination architectural register for the first instruction and a second physical register to the given destination architectural register for the second instruction (block 520). The method further includes designating, using the mapper circuit, the first physical register available for use in response to execution of the second instruction by an execute stage of the processor pipeline (block 525).

In various embodiments, the method may include storing, in a free list circuit, a list of available physical registers, and selecting, using the mapper circuit, a particular physical register from the list of available physical registers for assigning to a destination architectural register associated with a particular instruction. In such embodiments, the method may further include returning, using the mapper circuit, the particular physical register to the list of available physical registers subsequent to execution of the instruction. This may include the mapper circuit returning the first physical register to the free list circuit in response to execution of the second instruction.

Embodiments of the method may also include storing, using a history file circuit, a history list comprising history of associations between ones of the physical registers and ones of the architectural registers. In response to execution of the first instruction, the method may include adding the first physical register to the history list, and may further include the mapper circuit removing the first physical register from the history list in response to retirement of the second instruction.

In various embodiments, the first and second instructions are consecutive instructions and are included in a same reorder buffer group. Embodiments of the method may also include, setting a bit associated with the first instruction to indicate that the first physical register is to be made available for use by another instruction in response to execution of the second instruction.

FIG. 6 is a flow diagram of another embodiment of a method for carrying out early physical register release. As with the previously discussed method, Method 600 may be carried out by and within any of the hardware embodiments discussed elsewhere in this disclosure. Hardware embodiments capable of carrying out Method 600, but not otherwise discussed herein, are also considered to fall within the scope of this disclosure.

Method 600 includes receiving instructions and detecting a dependency in which a destination architectural register is a source architectural register for a subsequent instruction that, upon execution, overwrites that architectural register (block 605). For example, a first instruction in such a scenario may write results to architectural register x0, while the second instruction may consume the results generated by the first instruction. After execution, the second instruction overwrites the results in x0 with its own results. Upon detecting such a condition, a mapper circuit maps a first physical register to the destination architectural register for the first instruction, while mapping a second physical register to the source/destination architectural register for the second instruction (block 610). As such, both instructions share the same architectural register, but due to the operation of the mapper, use different, renamed physical registers.

Method 600 further includes executing the first instruction and writing the results to the first physical register (block 615). Thereafter, the second instruction is executed, consuming the results from the first instruction in the first physical register and generating results that are written to a second physical register (block 620). Since both the first and second physical registers are mapped to a common architectural register, this has the effect of overwriting the architectural register. The first instruction may also be retired at this time.

After executing the second instruction and writing its results to the second physical register, the name of the first physical register is added to a history file, and is also released, with its name being place back into the free list at least one clock cycle ahead of the retirement of the second instruction (block 625). Upon its name being returned to the free list, the first physical register becomes available for mapping/renaming in association with another instruction. This may enable better performance or prevent stalls that might otherwise occur while waiting for enough registers to become available for renaming. Upon retirement of the second instruction, the first physical register is also removed from the history file (block 630).

Figure 7:
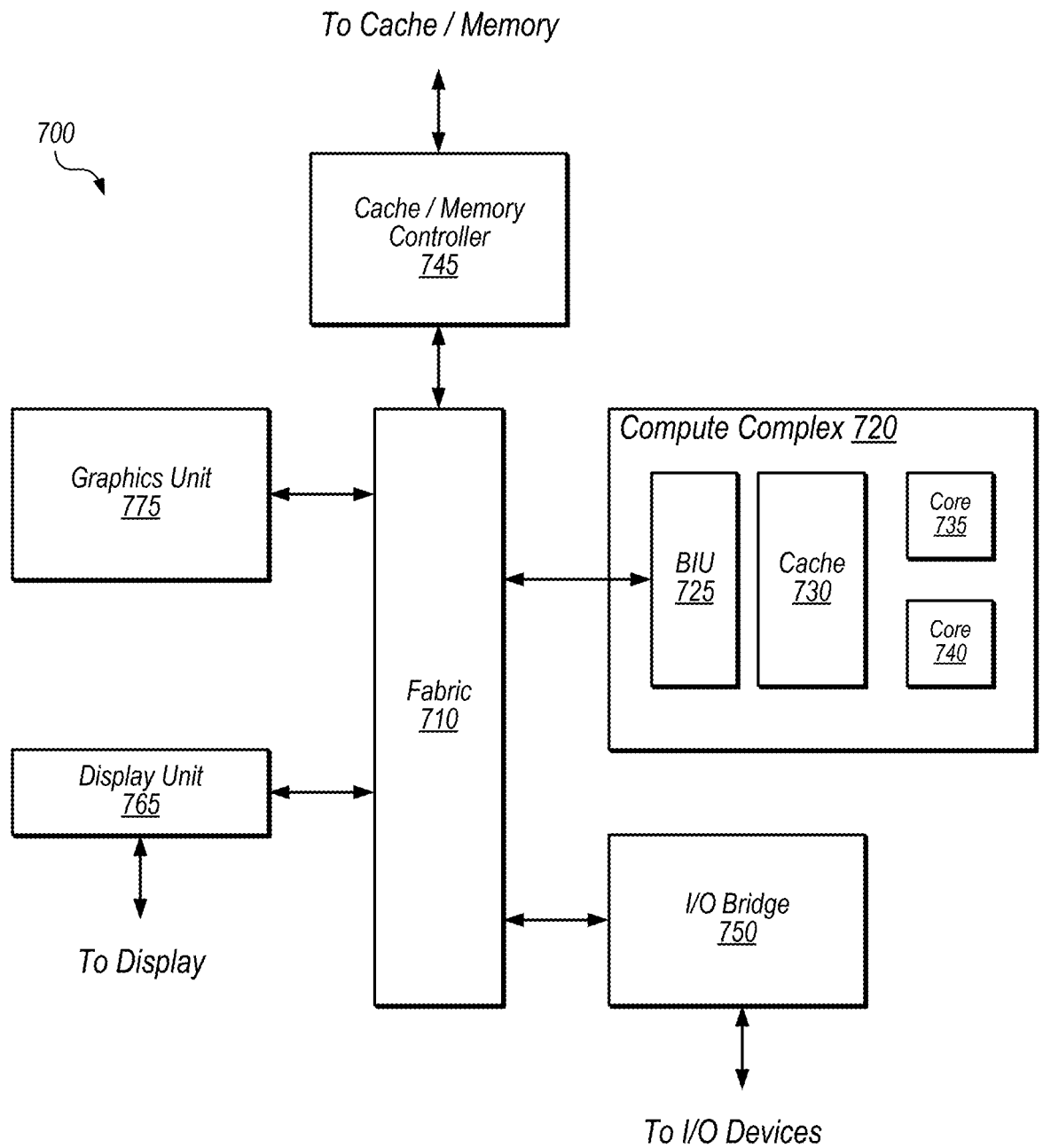
FIG. 7 is a block diagram illustrating an example embodiment of a device 700.

Example Device:

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

In various embodiments, one or more of the processor cores in compute complex 720 may be configured to carry out register renaming as discussed above. In particular, various circuitry implemented in the processor cores may detect conditions in which an instruction may be a consumer of information from a given architectural register, written by a previous instruction, while also using the same architectural register as a destination. The register renaming circuitry may rename a first physical register as the architectural register for the first instruction, and rename a second physical register as the architectural register for the second instruction. In response to execution of the second instruction, the first physical register may be released, thereby allowing it to be used for subsequent instructions.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPUs). Graphics unit 775 may receive graphics-oriented instructions, such as OPENGL®, Metal®, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications:

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in, e.g., FIGS. 1-4. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor circuit having a processor pipeline and configured to operate according to an instruction set architecture, wherein the instruction set architecture defines a number of architectural registers, and wherein the processor circuit includes:
      a register file circuit comprising a plurality of physical registers; and
      a mapper circuit configured to map destination architectural registers for received instructions to physical registers, wherein the mapper circuit is further configured to:
         detect a first condition in which a first instruction being processed by the processor pipeline has a given destination architectural register and a second, subsequent instruction that is a single consumer of the given destination architectural register specified in the first instruction overwrites the given destination architectural register;
         map a first physical register to the given destination architectural register for the first instruction, and a second physical register to the given destination architectural register for the second instruction; and
         in response to the second instruction being executed in an execute stage of the processor pipeline, designate the first physical register as being available for use at least one clock cycle of the processor circuit prior to retirement of the second instruction.

2. The apparatus of claim 1, further comprising a free list circuit configured to store a list of physical registers that are available, wherein the mapper circuit is further configured to:
   select a particular physical register from the list of available physical registers for mapping to a destination architectural register associated with a particular instruction; and
   return the particular physical register to the list of available physical registers subsequent to execution of the particular instruction.

3. The apparatus of claim 2, wherein the mapper circuit is further configured to return the first physical register to the free list circuit in response to execution of the second instruction.

4. The apparatus of claim 2, further comprising a history file circuit configured to store a history list comprising history of associations between ones of the plurality of physical registers and ones of the architectural registers.

5. The apparatus of claim 4, wherein the mapper circuit is configured to add the first physical register to the history list in response to execution of the first instruction.

6. The apparatus of claim 5, wherein the mapper circuit is configured to remove the first physical register from the history list in response to retirement of the second instruction.

7. The apparatus of claim 1, wherein the first and second instructions are consecutive instructions.

8. The apparatus of claim 1, wherein the first and second instruction are included in a same reorder buffer group.

9. The apparatus of claim 1, wherein the mapper circuit is configured to set a bit associated with the first instruction to indicate that the first physical register is to be made available for use by another instruction in response to execution of the second instruction.

10. A method comprising:
    receiving instructions in a mapper circuit of a processor, wherein the processor includes a processor pipeline and operates according to an instruction set architecture that defines a number of architectural registers;
    mapping, using the mapper circuit, selected physical registers of a register file to destination architectural registers, for received ones of the instructions;
    detecting, using the mapper circuit, a first condition in which a first instruction has a given destination architectural register, and a second instruction is a single consumer of the given destination architectural register and overwrites the given destination architectural register;
    assigning, using the mapper circuit, a first physical register to the given destination architectural register for the first instruction and a second physical register to the given destination architectural register for the second instruction; and
    designating, using the mapper circuit, the first physical register available for use in response to execution of the second instruction by an execute stage of the processor pipeline.

11. The method of claim 10, further comprising:
    storing, in a free list circuit, a list of available physical registers;
    selecting, using the mapper circuit, a particular physical register from the list of available physical registers for assigning to a destination architectural register associated with a particular instruction; and
    returning, using the mapper circuit, the particular physical register to the list of available physical registers subsequent to execution of the particular instruction.

12. The method of claim 11, further comprising the mapper circuit returning the first physical register to the free list circuit in response to execution of the second instruction.

13. The method of claim 11, further comprising:
    storing, using a history file circuit, a history list comprising history of associations between ones of the physical registers and ones of the architectural registers; and
    adding the first physical register to the history list in response to execution of the first instruction.

14. The method of claim 13, further comprising the mapper circuit removing the first physical register from the history list in response to retirement of the second instruction.

15. The method of claim 10, wherein the first and second instructions are consecutive instructions and are included in a same reorder buffer group.

16. The method of claim 10, further comprising setting a bit associated with the first instruction to indicate that the first physical register is to be made available for use by another instruction in response to execution of the second instruction.

17. A system comprising:
a processor circuit configured to operate according to an instruction set architecture, the instruction set architecture defining a plurality of architectural registers, wherein the processor circuit includes:
a register file circuit having a plurality of physical registers;
a mapper circuit configured to map physical registers to architectural registers corresponding to respective destinations of received instructions, and wherein the mapper circuit is further configured to:
detect a first condition in which a first instruction being processed by a pipeline of the processor circuit has a given destination architectural register and a second instruction that is a last consumer of the given destination architectural register specified in the first instruction, wherein the second instruction overwrites the given destination architectural register;
assign a first physical register as the given destination architectural register for the first instruction and a second physical register as the given destination architectural register for the second instruction; and
in response to execution of the second instruction in an execution circuit of the pipeline of the processor circuit, designate the first physical register as being available for use at least one clock cycle of the processor circuit prior to retirement of the second instruction.

18. The system of claim 17, wherein the first and second instructions are consecutive instructions.

19. The system of claim 17, wherein the second instruction is a single consumer of the given destination architectural register specified in the first instruction.

20. The system of claim 17, further comprising a free list circuit configured to store a list of physical registers that are available, wherein the mapper circuit is further configured to:
select a particular physical register from the list of available physical registers for assigning to a destination architectural register associated with a particular instruction; and
return the particular physical register to the list of available physical registers subsequent to execution of the particular instruction.

* * * * *